United States Patent
Tang et al.

(10) Patent No.: US 11,301,865 B2
(45) Date of Patent: Apr. 12, 2022

(54) SECURE CARD DATA ENTRY SYSTEM AND METHOD

(71) Applicant: Worldline SMB US Inc., Boston, MA (US)

(72) Inventors: Joey Tang, Andover, MA (US); Russell Kondaveti, Franklin, MA (US)

(73) Assignee: Worldline SMB US Inc., Boston, MA (US)

(*) Notice: Subject to any disclaimer, the term of this patent is extended or adjusted under 35 U.S.C. 154(b) by 166 days.

(21) Appl. No.: 16/046,605

(22) Filed: Jul. 26, 2018

(65) Prior Publication Data
US 2019/0034929 A1  Jan. 31, 2019

Related U.S. Application Data
(60) Provisional application No. 62/537,693, filed on Jul. 27, 2017.

(51) Int. Cl.
*G06Q 20/40* (2012.01)
*H04L 9/30* (2006.01)
(Continued)

(52) U.S. Cl.
CPC ......... *G06Q 20/409* (2013.01); *G06F 21/602* (2013.01); *G06F 21/6245* (2013.01);
(Continued)

(58) Field of Classification Search
None
See application file for complete search history.

(56) References Cited

U.S. PATENT DOCUMENTS

| | | | |
|---|---|---|---|
| 2012/0089481 A1 | 4/2012 | Iozzia et al. | |
| 2012/0143770 A1* | 6/2012 | Pauker | G06Q 20/3823 705/71 |
| 2016/0342997 A1 | 11/2016 | De Tella et al. | |

FOREIGN PATENT DOCUMENTS

WO    2011126520 A1    10/2011

OTHER PUBLICATIONS

Stack Overflow, "Difference between framework vs Library vs IDE vs API vs SDK vs Toolkits?," downloaded from https://stackoverflow.com/questions/8772746/difference-between-framework-vs-library-vs-ide-vs-api-vs-sdk-vs-toolkits on Jun. 23, 2020, all pages. (Year: 2012).*

(Continued)

*Primary Examiner* — Jacob C. Coppola
(74) *Attorney, Agent, or Firm* — Nutter McClennen & Fish LLP (57) ABSTRACT

Embodiments leverage the PCI-DSS validation of a backend transaction processing system to avoid the payment application having to meet the PCI compliance reporting requirements of the PCI-DSS. When the payment application needs to collect Sensitive Data for a transaction, the payment application makes a request to the payment library, which in turn requests from the backend system a secure web page including fields for the user to enter the specific Sensitive Data to be collected and typically also including a public encryption key generated specifically for the secure web page. The payment library causes the secure web page to be rendered, thereby allowing the user to enter the required information. Upon completion of such data entry, the data entered via the secure web page is pushed back through the payment library to the backend system for processing. The backend system can decrypt the encrypted data using the (Continued)

private key associated with the public/private encryption key pair.

16 Claims, 9 Drawing Sheets

(51) Int. Cl.
*H04L 9/08* (2006.01)
*G06Q 20/38* (2012.01)
*G06Q 20/02* (2012.01)
*G06Q 20/32* (2012.01)
*G06F 21/62* (2013.01)
*G07F 7/08* (2006.01)
*G06F 21/60* (2013.01)

(52) U.S. Cl.
CPC ......... *G06Q 20/027* (2013.01); *G06Q 20/322* (2013.01); *G06Q 20/3829* (2013.01); *G07F 7/0886* (2013.01); *H04L 9/0825* (2013.01); *H04L 9/0894* (2013.01); *H04L 9/30* (2013.01); *G06Q 2220/00* (2013.01); *H04L 2209/56* (2013.01)

(56) References Cited

OTHER PUBLICATIONS

Shukla, Shashvat, "Framework vs Library vs Platform vs API vs SDK vs Toolkits vs IDE," downloaded from https://medium.com/@shashvatshukla/framework-vs-library-vs-platform-vs-api-vs-sdk-vs-toolkits-vs-ide-50a9473999db on Jun. 23, 2020, all pages. (Year: 2017).*
J. Hizver and T. Chiueh, "Automated Discovery of Credit Card Data Flow for PCI DSS Compliance," 2011 IEEE 30th International Symposium on Reliable Distributed Systems, Madrid, 2011, pp. 51-58, doi: 10.1109/SRDS.2011.15. (Year: 2011).*
AT&T "Mobile Payment Applications—Can They be PCI Compliant?" *AT&T Intellectual Property,* 4 pages, Aug. 11, 2011.
Emerging Technologies, PCI Security Standards Council, "PCI Mobile Payment Acceptance Security Guidelines for Developers," Version 1.0, pp. 1-19, Sep. 2012.
Emerging Technologies, PCI Security Standards Council, "PCI Mobile Payment Acceptance Security Guidelines for Merchants as End-Users," Version 1.0, pp. 1-27, Feb. 2013.
Ingenico Group, "mPOS EMV SDK," [online]; Retrieved from the Internet: https://ingenico.us/mobile-solutions-mpos-emv-sdk, 5 pages; retrieved from Internet on May 17, 2017.
Penny, Brian, "PCI Compliance for Mobile Devices," *CardFellow,* [online]; Retrieved from Internet: https://www.cardfellow.com/pci-com-compliance-for-mobile-devices/, 8 pages; retrieved from Internet on Jun. 23, 2017.
PCI Security Standards Council, "Accepting Mobile Payments with a Smartphone or Tablet," *PCI Security Council, LLC,* 2 pages, Aug. 2014.
International Searching Authority—International Search Report and Written Opinion for International Application No. PCT/US2019/018566, dated Apr. 15, 2019, 16 pages.
Extended European Search Report for Application No. 18838452.3-1213 / 3659084 PCT/2018043918, dated Apr. 1, 2021, 7 pages.

* cited by examiner

Headers

| Header | Required | Description |
|---|---|---|
| X-Roam-Token | Yes | Session token from the login response. We use this to identify the ApiAccount and its permissions. |
| X-Roam-ApiVersion | Yes | API version e.g. 5.0.0 |
| X-Roam-ClientVersion | Yes | Client version which can be different by different applications. This needs to set by developers. e.g. 1.0.0 |
| Content-Type | Yes | Content type. e.g. application/json |

(Input) Query Parameters

| Parameter | Type | Criteria | Required | Description |
|---|---|---|---|---|
| filter | String | | Yes | Specific config key will be used to retrieve the secure entry card template. |
| source | String | | Yes | Process or fetch the template based up on the source. e.g. ios, android, windows etc |

HTTP Response Codes

| HTTP Code | Description |
|---|---|
| 200 | OK, response included in body |
| 404 | Resource not found. PATH not found (/wsapi/GatewayBoarding was not the path submitted) |
| 400 | Bad request. Unable to parse the JSON object in the request |
| 500 | Internal server error. Typically indicates an exception occurred while processing the request. |

FIG. 7

Sample Usage:

Request:
GET /wsapi/Templates?filter=(configKey=security.secure_card_entry.template)&source=ios Response:

HTTP Status Code : 200 OK

```
{
  "records_list": [
    {
      "id": 95,
      "content": "<!-- Template -->\r\n<div id=\"*\">\r\n........\r\n</div>\r\n",
      "name": "SecureEntryCard",
      "org_id": 1,
      "date_created": "20170503140341",
      "date_modified": "20170503140341"
    }
  ]
}
```

FIG. 8

| Key Reference ID | Public Key | Private Key | Expiration Date | Usage Limit | OrgId |
|---|---|---|---|---|---|
| 123567 | -----BEGIN PUBLIC KEY----- MIGfMA0GCSqGSIb3DQEBAQUAA4GN ... -----END PUBLIC KEY----- | -----BEGIN RSA PRIVATE KEY----- MIICXQIBAAKBgQDlOJu6TyygqxfWT7eLtGDvwsjN ... -----END RSA PRIVATE KEY----- | 20170617155029 | 1000 | 1245 |

FIG. 9

| Parameter | Type/Format | Required | Description | | | |
|---|---|---|---|---|---|---|
| pos_entry_source | ENUM | No | Method used to capture the card data | | | |
| | | | Source | code | Description | |
| | | | mobile | 0 | Card entered on mobile device, default for manual entry if not specified | |
| | | | device | 1 | Card entered on reader / pin-pad device, default for non manual entry types, possible on RP750 for manual entry | |
| | | | secure | 2 | Card entered through secure card entry widget, manual entry only | |

FIG. 10

| Parameter | Type/Format | Required | Description | | | | |
|---|---|---|---|---|---|---|---|
| secure_track | JSON | No | For POS entry source type "secure", the track data will be submitted in this field, with the following JSON format: | | | | |
| | | | Parameter | Type/Format | Description | | |
| | | | secure_card_data_key_reference | GUID | Reference to key used to encrypt digits | | |
| | | | secure_card_data | ARRAY | Array of digits entered by the user, with the following elements for each entry | | |
| | | | | | Parameter | Type/Format | Description |
| | | | | | digit | ANS(1-255) | Digit entered, if encrypted, the Base64 encoded encrypted block |
| | | | | | encrypted | BOOL | True if digit is encrypted, false if it is plain-text |

FIG. 11

SECURE CARD DATA ENTRY SYSTEM AND METHOD

CROSS-REFERENCE TO RELATED APPLICATION(S)

This patent application claims the benefit of U.S. Provisional Patent Application No. 62/537,693 entitled SECURE CARD DATA ENTRY SYSTEM AND METHOD filed on Jul. 27, 2017, which is hereby incorporated herein by reference in its entirety.

FIELD OF THE INVENTION

The present invention relates generally to secure card data entry systems and methods.

BACKGROUND OF THE INVENTION

Secure card data entry systems and method generally must meet PCI-DSS requirements, which can place an enormous burden (and risk) on vendors who want to provide card data entry systems and/or accept card payments using such systems.

SUMMARY OF EXEMPLARY EMBODIMENTS

In accordance with one embodiment of the invention, a system for providing secure card data entry for a payment transaction comprises a card data collection device that includes a non-PCI-DSS validated payment application and a payment library, wherein the payment library includes an application program interface (API) through which the payment application interfaces with the payment library, and further includes a PCI-DSS validated backend system that processes transactions from the payment library. The payment application is configured to make a first request to the payment library upon determining that sensitive data is required for the payment transaction. The payment library is configured to make a second request to the backend system upon receiving the first request from the payment application. The backend system is configured to return a secure card entry webpage to the payment library in response to the second request, the secure card entry webpage including fields for a user to enter sensitive data and further including a public encryption key for encrypting sensitive data entered by the user. The payment library is configured to cause rendering of the secure card entry webpage on a graphical user interface of the card data collection device, receive encrypted sensitive data entered by the user via the secure card entry webpage, and transmit a transaction request including the encrypted sensitive data to the backend system. The backend system is configured to process the transaction request including decrypting the encrypted sensitive data using a private encryption key corresponding to the public encryption key.

In various alternative embodiments, the secure card entry webpage may be configured so that each digit of sensitive data entered by the user is encrypted as it is entered. The backend system may be configured to generate the public encryption key and the private encryption key upon receiving the second request. The backend system may be configured to store at least the private encryption key for use in decrypting the encrypted sensitive data. The backend system may be configured to associate the public encryption key and the private encryption key with a key reference identifier and to include the key reference identifier in the secure card entry webpage. The payment library may be configured to include the key reference identifier in the transaction request. The backend system may be configured to associate the public encryption key and the private encryption key with an expiration day/time and to include the expiration day/time in the secure card entry webpage. The payment library may be configured to render the secure card entry webpage or may be configured to send the secure card entry webpage to a native browser of the card data collection device for rendering. The card data collection device may be a smartphone or tablet computer. The system may further comprise a card reader device in communication with the card data collection device, wherein the payment library is configured to include card data obtained from the card reader device in the transaction request. The backend system is configured to generate the secure card entry webpage based on a stored webpage template. The backend system may comprise a Mobile Commerce Manager configured to receive the second request, generate the secure card entry webpage, return the secure card entry webpage to the payment library, and decrypt the encrypted sensitive data in the transaction request; and a Gateway configured to receive the transaction request and transmit a request to the Mobile Commerce Manager for decryption of the encrypted sensitive data in the transaction request. The Mobile Commerce Manager and the Gateway may be separate physical devices or may be separate logical devices.

In accordance with another embodiment of the invention, a system for providing secure card data entry for a payment transaction comprises a Mobile Commerce Manager and a Gateway, wherein the Mobile Commerce Manager is configured to (a) generate, in response to a first request from a payment library over a communication network, a secure card entry webpage including fields for a user to enter sensitive data and further including a public encryption key for encrypting sensitive data entered by the user via the secure card entry webpage, and (b) decrypt, in response to a second request from the Gateway, encrypted sensitive data entered by the user via the secure card entry webpage; and the Gateway is configured to receive, from the payment library over the communication network, a transaction request including the encrypted sensitive data entered by the user via the secure card entry webpage, and in response to the transaction request, to transmit the second request to the Mobile Commerce Manager for decryption of the encrypted sensitive data in the transaction request and to process the transaction request based on the decrypted sensitive data. The Mobile Commerce Manager and the Gateway may be separate physical devices or may be separate logical devices.

In accordance with another embodiment of the invention, a tangible, non-transitory computer-readable medium having stored therein a computer program for providing secure card data entry for a payment transaction which, when executed by a processor in a card data collection device, causes the card data collection device to implement a payment library including an application program interface (API) through which the payment library interfaces with a payment application and a communication interface for communication with a backend system, wherein the payment library is configured to receive a first request from the payment application upon the payment application determining that sensitive data is required for the payment transaction, make a second request to the backend system upon receiving the first request from the payment application, receive from the backend system the secure card entry webpage including fields for a user to enter sensitive data and further including a public encryption key for encrypting sensitive data entered by the user, cause rendering of the secure card entry webpage on a graphical user interface of the card data collection device, receive encrypted sensitive data entered by the user via the secure card entry webpage, and transmit a transaction request including the encrypted sensitive data to the backend system.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions. As used in this description and the accompanying claims, the following terms shall have the meanings indicated, unless the context otherwise requires:

UI=User Interface.
OS=Operating System.
API=Application Program Interface.
mPOS=Mobile Point of Sale.

EMV is a technical standard for smart payment cards and for payment terminals and automated teller machines that can accept them. EMV cards are smart cards (also called chip cards or IC cards) that store their data on integrated circuits in addition to magnetic stripes (for backward compatibility). These include cards that must be physically inserted (or "dipped") into a reader and contactless cards that can be read over a short distance using radio-frequency identification (RFID) technology. Payment cards that comply with the EMV standard are often called Chip and PIN or Chip and Signature cards, depending on the authentication methods employed by the card issuer. EMV stands for Europay, MasterCard, and Visa, the three companies that originally created the standard. The standard is now managed by EMVCo, a consortium with control split equally among Visa, MasterCard, JCB, American Express, China UnionPay, and Discover.

SDK=Software Development Kit.
CVV=Card Verification Value.
EXP=Expiration Date.
PAN=Primary Account Number.
PIN=Personal Identification Number.
SSN=Social Security Number.

"Sensitive Data" collected as part of a transaction can include some or all of PAN, EXP, CVV, PIN, SSN, a portion of the PAN (e.g., last four digits entered manually), a portion of the SSN (e.g., last four or six digits entered manually), name, address, or other data that may be required or requested as part of the transaction.

ISV=Independent Software Vendor, which is generally the customer of the SDK Vendor.

PCI=Payment Card Industry, which is an organization that describes itself as providing a global forum for the ongoing development, enhancement, storage, dissemination and implementation of security standards for account data protection (see https://www.pcisecuritystandards.org/, the contents of which are hereby incorporated by reference).

PCI-DSS=PCI Data Security Standard, which is a set of standards for enhancing payment card data security. PCI-DSS is managed by the PCI Security Standards Council (see https://www.pcisecuritystandards.org/pci_security/standards_overview, the contents of which are hereby incorporated by reference).

MCM=ROAM/Ingenico Mobile Commerce Manager, a proven, highly-scalable and secure management solution providing a fully integrated suite of mCommerce management tools that are the key to accelerating mobile point of sale for businesses of all sizes (see http://mobile-solutions.ingenico.com/sites/default/files/assets/ROAM_MCM_Product_Sheet.pdf, the contents of which are hereby incorporated by reference).

mPOS EMV SDK=ROAM/Ingenico software development toolkit (see https://ingenico.us/binaries/content/assets/us-website/library/brochures/mpos-emv-sdk-solution-sheet.pdf and https://ingenico.us/mobile-solutions/mpos-emv-sdk, the contents of which are hereby incorporated by reference). Various exemplary embodiments of the invention are described with references to the mPOS EMV SDK, although it should be noted that other vendors have their own SDKs, and alternative embodiments can be implemented by other vendors using their own SDKs or variants thereof that incorporate technologies described herein.

The "SDK Vendor" is the vendor that provides the SDK or otherwise implements the technological solutions described herein. In the case of the mPOS EMV SDK, the SDK Vendor would be ROAM/Ingenico.

E2EE=End-to-End Encryption. Some aspects of E2EE with respect to PCI-DSS are discussed in http://www.csoonline.com/article/2124346/compliance/end-to-end-encryption-the-pci-security-holy-grail.html, the contents of which are hereby incorporated by reference.

WSAPI=Web Services API.
JSON=JavaScript Object Notation.

Many portable payment systems today utilize a card data collection device (e.g., a smartphone, tablet, etc.) to capture data from a transaction card (e.g., a credit card, debit card, loyalty card, etc.). A card reader device may be configured to read card data using any appropriate technology (e.g., from a magnetic stripe or EMV chip) and may be connected to the card data collection device (e.g. via USB, Bluetooth, audio jack, etc.) in order to convey card data and possibly other data to the card data collection device. The card data collection device typically includes an operating system (e.g., iOS, Android, Windows, etc.) and runs an application (or "app") that, among other things, provides a user interface to facilitate a user in completing a transaction. Typically, the app incorporates a payment library or software development kit (SDK) that, among other things, handles communications with the card reader device as well as communications with a backend system through which the transaction is completed. The app also may provide an interface through which the user can enter various types of Sensitive Data as required for a particular transaction. Often, the app is provided by an ISV that is different than the payment library/SDK vendor.

Figure 1:
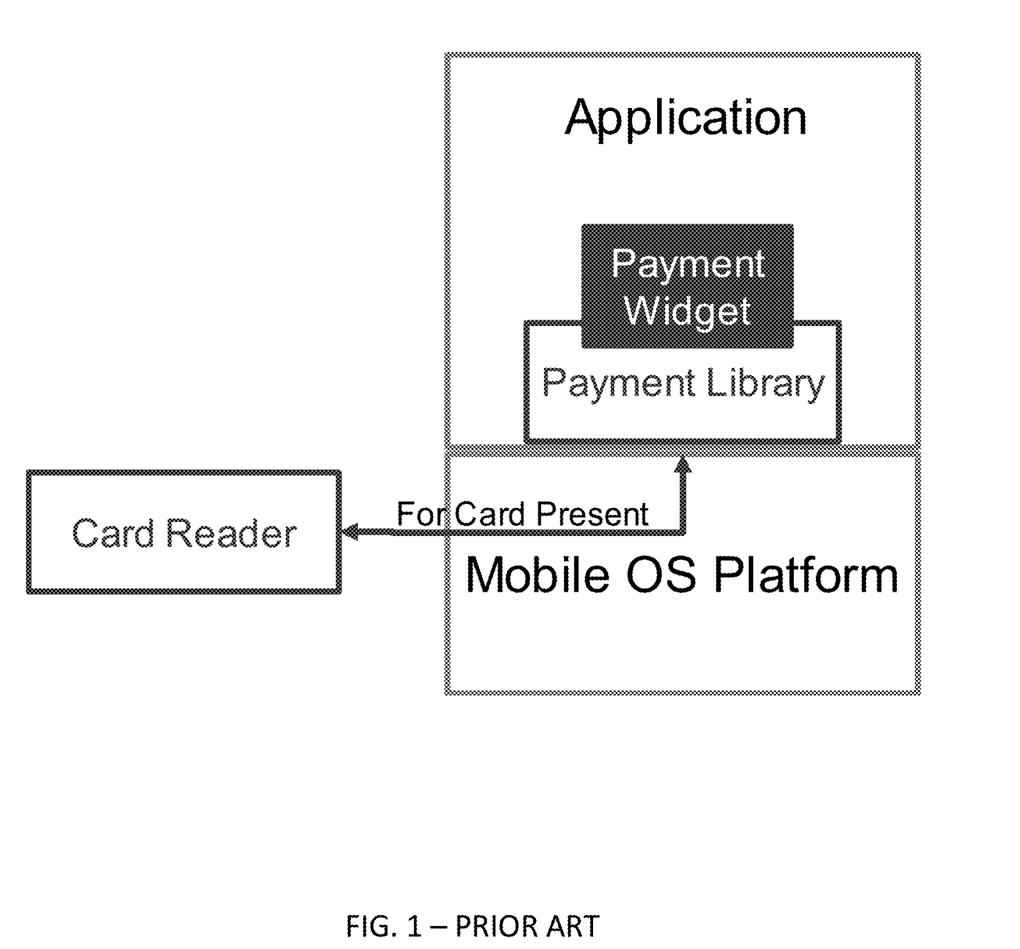
FIG. 1 shows one secure card data collection approach as known in the art.

FIG. 1 shows one secure card data collection approach as known in the art. Here, the payment vendor introduces a UI component/widget in their payment library/SDK to capture the Sensitive Data. This approach may be insecure because the application gets to access the sensitive information and can be hacked. One example of such a secure card data collection approach is JudoPay SDK. According to JudoPay, Judopay Android library lets developers integrate secure in-app card payments and provides UI components for a seamless user experience for card data capture. JudoPay claims to minimize PCI scope with a UI that can be themed or customized to match the look and feel of the customer's app.

Figure 2:
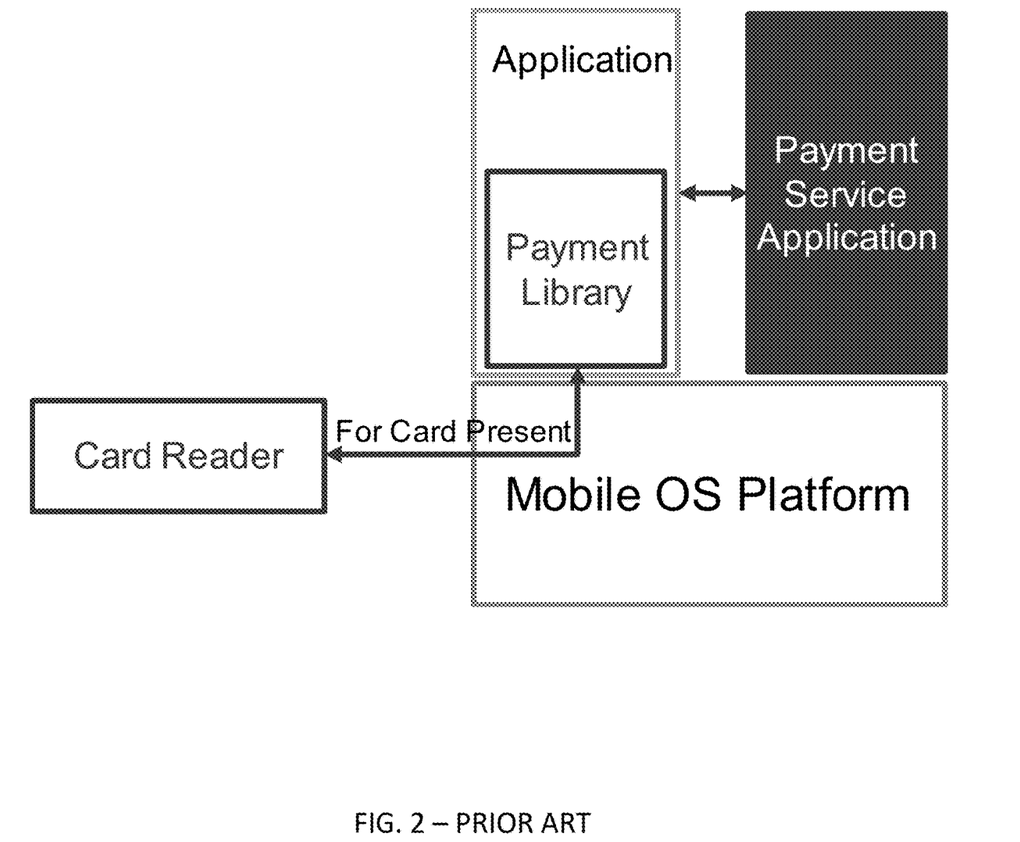
FIG. 2 shows another secure card data collection approach as known in the art.

FIG. 2 shows another secure card data collection approach as known in the art. Here, the payment vendor introduces a payment service application to capture the Sensitive Data. In this approach, the payment service application is a separate application, and therefore the user needs to install and update two apps. The payment library invokes the payment service application for information, the payment service application runs in the foreground, collects the data, processes the payment and then gets back to the payment library for the payment acknowledgement via an API. One example of such a secure card data collection approach is the Square Register API, which is described as using inter-app communication to let the customer's Android or iOS app open the Square Register app to process in-person payments with Square hardware (including the Square contactless and chip reader). Another example of such a secure card data collection approach is Poynt SDK for Android.

Embodiments of the present invention define new mechanisms for secure card data collection in order to minimize PCI scope of the ISV applications such that the ISV only needs to meet the Self Assessment Questionnaire (SAQ) requirements of the PCI-DSS rather than having to meet the PCI compliance reporting requirements of the PCI-DSS. Exemplary embodiments are described herein with reference to FIG. 3, which shows a secure card data collection approach in accordance with one embodiment of the present invention. Here, the ISV application incorporates the SDK Vendor payment library, which is configured to communicate with a PCI-DSS validated backend system and also with the native OS-owned app/browser, i.e., the native UI component of the OS that renders web pages (although the payment library could include a browser or otherwise be configured to render the second web page).

Figure 3:
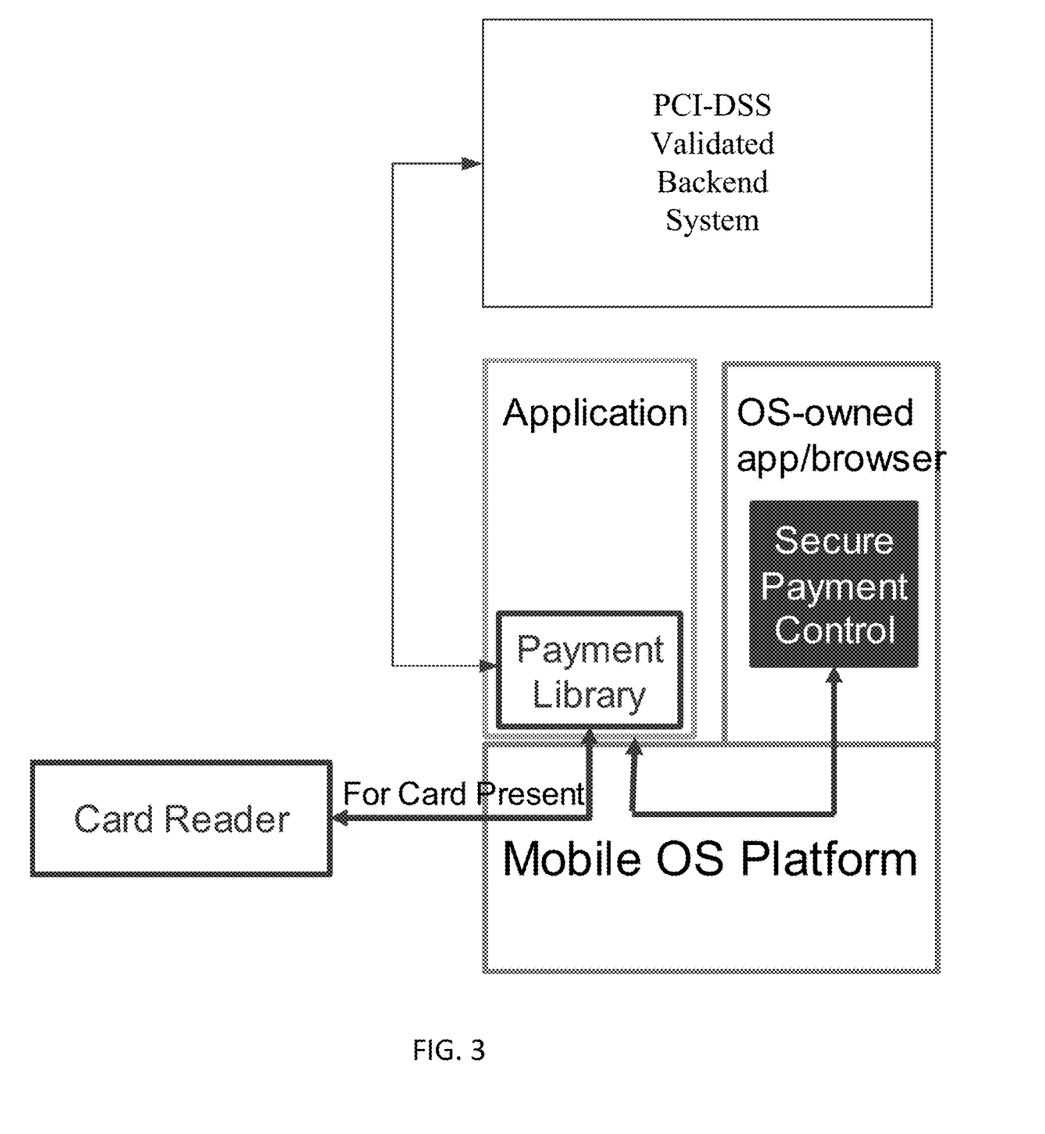
FIG. 3 shows a secure card data collection approach in accordance with one embodiment of the present invention.

When the ISV application needs to collect Sensitive Data for a transaction, the ISV application previously might generate a UI to collect the data, but this would put the ISV into the realm of PCI compliance reporting requirements of the PCI-DSS. Therefore, in exemplary embodiments, the ISV application makes a request to the payment library, which in turn requests a secure web page from the backend system. The secure web page includes fields for the user to enter the specific Sensitive Data to be collected (e.g., PAN, EXP, CVV, etc.). The secure web page can be configured to have the same look and feel as the ISV application. Upon receiving the secure web page from the backend system, the payment library causes the secure web page to be rendered, e.g., by routing the secure web page to the OS-owned app/browser using component-to-component communications within the device, thereby allowing the user to enter the required information. Typically, some or all of the entered data is encrypted, e.g., using a public key embedded by the backend system in the secure web page (e.g., when generating the secure web page, the backend system may generate an asymmetric public/private encryption key pair, e.g., using E2EE principles, and embed the public key in the secure web page that it serves to the payment library, preferably along with a key reference ID associated with the public/private encryption key pair). Upon completion of such data entry, the data entered via the secure web page is pushed back through the payment library to the backend system for processing, typically along with other data, such as, for example, the key reference ID that was received in the secure web page, card data obtained from a card reader device, and information regarding the card data collection device, the app, and/or the user (who may have to be logged into the system). The backend system can decrypt the encrypted data using the private key associated with the public/private encryption key pair. Thus, this solution leverages the PCI-DSS validation of the backend system to avoid the ISV having to meet the PCI compliance reporting requirements of the PCI-DSS.

In certain exemplary embodiments, some or all of the Sensitive Data is encrypted on a digit-by-digit basis as it is entered into the secure web page. Specifically, a public key embedded in the secure web page may be used to encrypt the data as it is entered into the web page so that such data is not stored "in the clear" either on the UI or in the memory of the device. Among other things, this reduces the chances for a hacker to recover the Sensitive Data using a memory dump attack. Also, the data generally is masked on the UI as it is being entered (e.g., not displayed at all, or displayed for only a short time) in order to prevent casual interception of the Sensitive Data.

In some embodiments, the payment library can specify whether or not encryption is required on a per-field or per-digit basis in the request that is sent for the web page.

Figure 4:
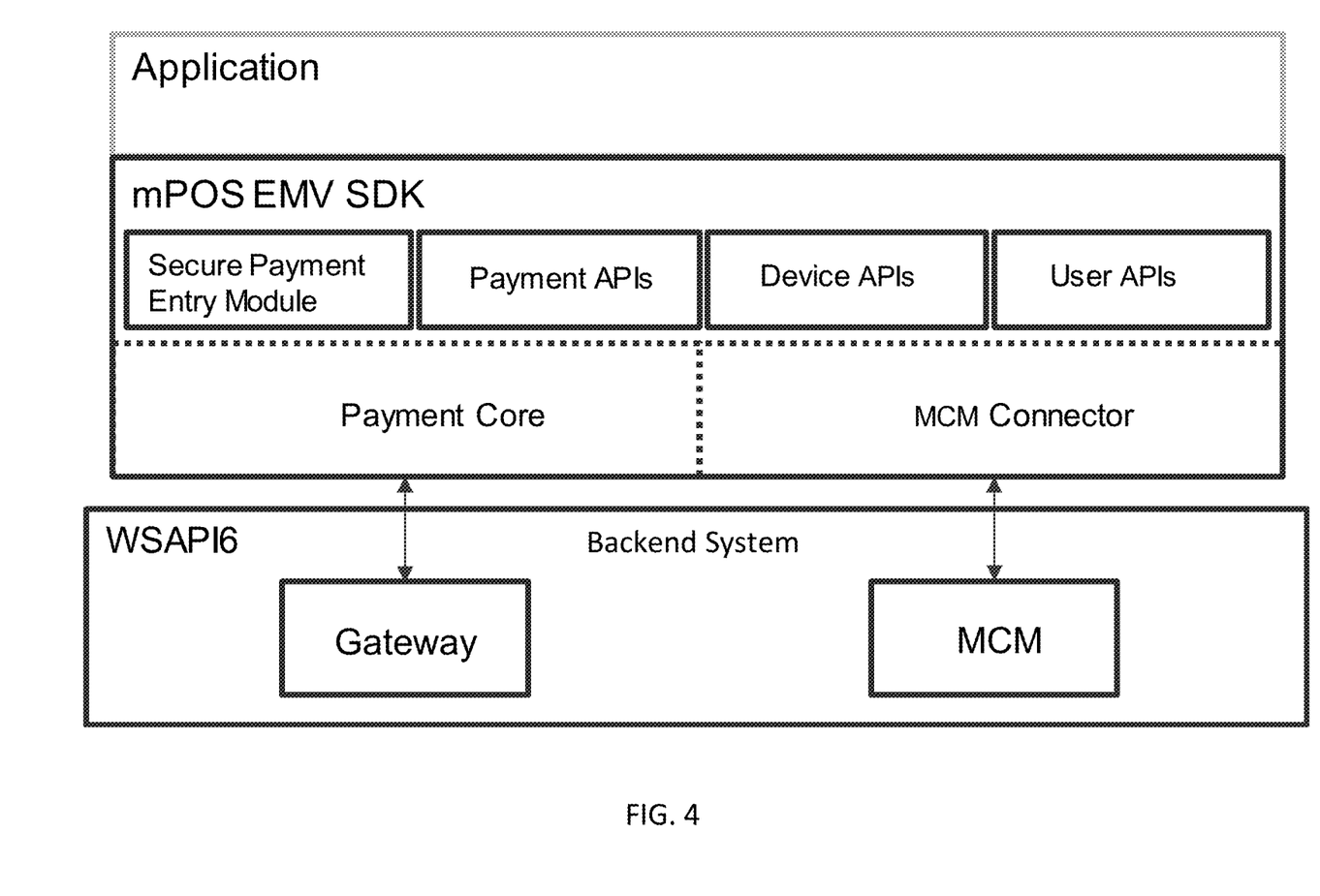
FIG. 4 is a schematic diagram showing components of the ISV application with payment library and the backend system, in accordance with one exemplary embodiment.

FIG. 4 is a schematic diagram showing components of the ISV application with payment library and the backend system, in accordance with one exemplary embodiment. Here, the ISV application incorporates the mPOS EMV SDK, which includes a Secure Payment/Data Entry Module, Payment APIs, Device APIs, User APIs, a Payment Core, and an MCM Connector. The backend system includes the Gateway and the MCM.

Figure 5:
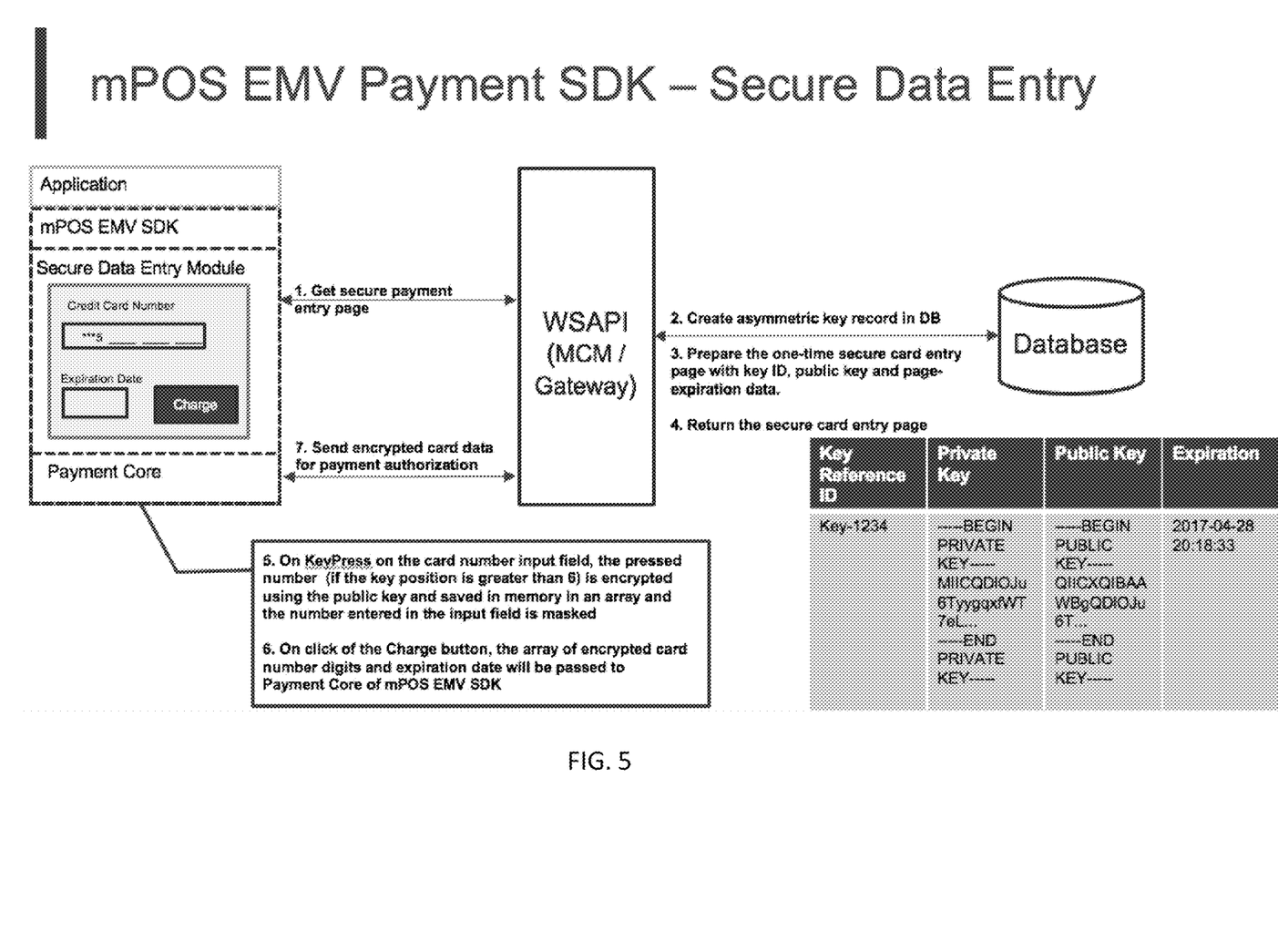
FIG. 5 is a schematic diagram showing various aspects of secure card data entry, in accordance with one exemplary embodiment.

FIG. 5 is a schematic diagram showing various aspects of secure card data entry, in accordance with one exemplary embodiment. Here, the payment library sends, via the MCM Connector, a request to the MCM of the backend system (1) for the secure web page. The MCM of the backend system receives the request, creates an asymmetric public/private encryption key record, and stores the asymmetric public/private encryption key pair in a database (2). FIG. 5 shows elements of a sample record in accordance with one exemplary embodiment, e.g., including a Key Reference ID, a Private Key, a Public Key, and an Expiration Day/Time. The MCM of the backend system prepares a one-time-use secure web page including the Key Reference ID, Public Key, and Expiration Day/Time (3) and returns the secure web page to the payment library (4) via the MCM Connector. The Secure Data Entry Module renders the secure web page on the device as discussed above. As data is entered, it is encrypted using the public key embedded in the secure web page, with the encrypted data stored in memory (5). When the user clicks the "charge" button on the secure web page, the secure web page including the encrypted data and Expiration Day/Time is sent by the OS-owned app/browser to the payment library (6), which in turn sends transaction data including the Key Reference ID and the encrypted data entered through the secure web page to the Gateway of the backend system for processing (7). The Gateway of the backend processing system can use the private key (retrieved using the Key Reference ID) to decrypt the encrypted transaction data and complete the transaction. The Gateway of the backend processing system can return transaction status information (e.g., payment completed, payment rejected, etc.) to the app.

Figure 6:
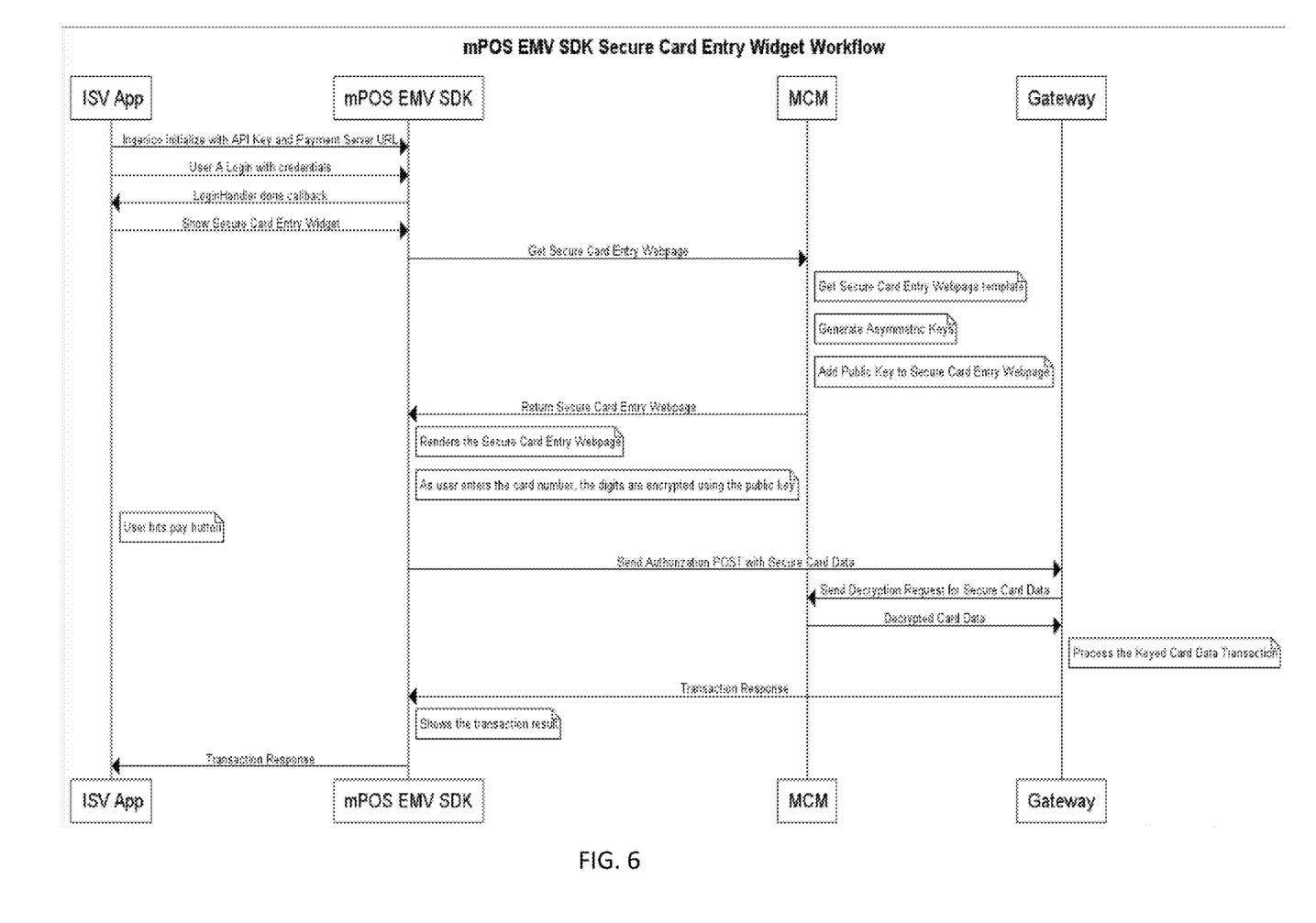
FIG. 6 is a logic flow diagram showing additional details of the secure card data entry mechanism shown in FIG. 5, in accordance with one exemplary embodiment.

FIG. 6 is a logic flow diagram showing additional details of the secure card data entry mechanism shown in FIG. 5, in accordance with one exemplary embodiment. When the app is opened, the ISV app initializes the mPOS EMV SDK with an API Key and a Payment Server URL. The user logs onto the system via the ISV app by providing required credentials, and the mPOS EMV SDK provides configuration (LoginHandler done callback) to the ISV app. When Sensitive Data is required for a transaction, the ISV app makes a call to the mPOS EMV SDK to obtain the secure card entry webpage, and the mPOS EMV SDK in turn makes a call to the MCM to obtain the secure card entry webpage. The MCM generates the secure card entry webpage by obtaining a secure card entry webpage template from a storage, generating a set of asymmetric keys, and adding the public key to the secure card entry webpage, and returns the secure card entry webpage to the mPOS EMV SDK. The mPOS EMV SDK renders the secure card entry webpage via the native browser. The user is then able to enter Sensitive Data via the secure card entry webpage. In this exemplary embodiment, as the user enters data, the data is encrypted using the public key that was embedded in the secure card entry webpage by the MCM. Upon completion of the data entry by the user, the mPOS EMV SDK sends a transaction (POST) request to the Gateway including the data entered via the secure card entry webpage and any other information required for the transaction (e.g., transaction amount, card data obtained from a card reader device, etc.). The Gateway sends a request to the MCM to decrypt the data that was entered via the secure card entry webpage, and the MCM decrypts the data using the private key corresponding to the public key that was embedded in the secure card entry webpage and returns the decrypted data to the Gateway. The Gateway then processes the transaction and sends a transaction response to the mPOS EMV SDK, which can then display the transaction result (e.g., transaction completed, transaction rejected, etc.). The mPOS EMV SDK sends similar transaction status information to the ISV app. It should be note that the MCM and the Gateway are shown as being separate components of the WSAPI and can be implemented in different ways, e.g., as separate physical or logical entities, or as a single physical or logical entity (e.g., the MCM and the Gateway could be implemented together such that no explicit decryption request would be needed).

As discussed above, the backend system preferably associates the public/private encryption key pair with an Expiration Day/Time that is included in the secure web page served to the mPOS EMV SDK and also stored by the backend system. The Expiration Day/Time can be used by the mPOS EMV SDK and/or the backend system to reject transactions that are past the Expiration Day/Time.

The following are some functional specifications and considerations for one exemplary embodiment and should not be deemed to limit the invention:

The functional requirements for the secure card entry widget will be spread across the WSAPI (MCM and Gateway) and the mPOS EMV SDK. The MCM is configured to create the Secure Card Entry Webpage Template, generate the asymmetric key pair (public and private key pair), add a new API to retrieve the secure card entry webpage, and add support for decryption of the secure card data (encrypted with public key) upon request from the Gateway. The Gateway is configured to add a new transaction type (SecureCardEntry), add new fields to Authorization API to pass the secure card data, and integrate the decryption of secure card data as discussed above. The mPOS EMV SDK is configured to add a new API to C++ to get the secure card entry webpage consuming the API exposed by MCM, add new API to C++ to pass along the secure card data to the Gateway, and create new UI widgets for different operating systems, e.g., Android (Fragment) and iOS (ViewController).

Create Secure Card Entry Webpage Template

The Secure Card Entry Webpage template should be configured to capture card number, expiration date, CVV, AVS zip code and provide a button (submit) to process the payment using the entered card data. The webpage should be designed so that the public key that would be used for encrypting card digits can be injected into it. There can be multiple "flavors" of the same webpage depending on the OS that would be rendering the webpage.

Card Number Textfield Specification

The card number textfield should allow entry up to 20 digits.

The card number textfield should format the card number entered with spaces.

The card number textfield should validate if the card number entered conforms to Luhn algorithm.

The card number should validate the bin range for determining the card brand and show the appropriate card brand logo.

The card number should validate the length of the card number entered based on the card brand.

The card number textfield should save each entered digit in an array.

The card number textfield should mask all the digits except the first 6 and last 4.

The card number textfield should save the masked digits encrypted using the public key provided in memory.

The card number textfield should show inline error message if the card number entered fails validation listed above.

Backspace should be supported and should not break the functionality or security.

Expiration Date Textfield Specification

The expiration date textfield should allow entry up to 4 digits.

The expiration date textfield reformat the entered digits to MM/YY format.

The expiration date textfield should validate if the expiration date is not in past.

The expiration date textfield should show inline error message if the date entered fails validation listed above.

CVV (Security Code) Textfield Specification

The CVV code textfield should allow entry of 3 digits for every card brand except AMEX cards.

The CVV code textfield should allow entry of 4 digits for AMEX cards.

AVS (Zip Code) Textfield Specification

The AVS zip code textfield should allow entry up to 10 digits including hyphen.

Templates API

Figure 7:
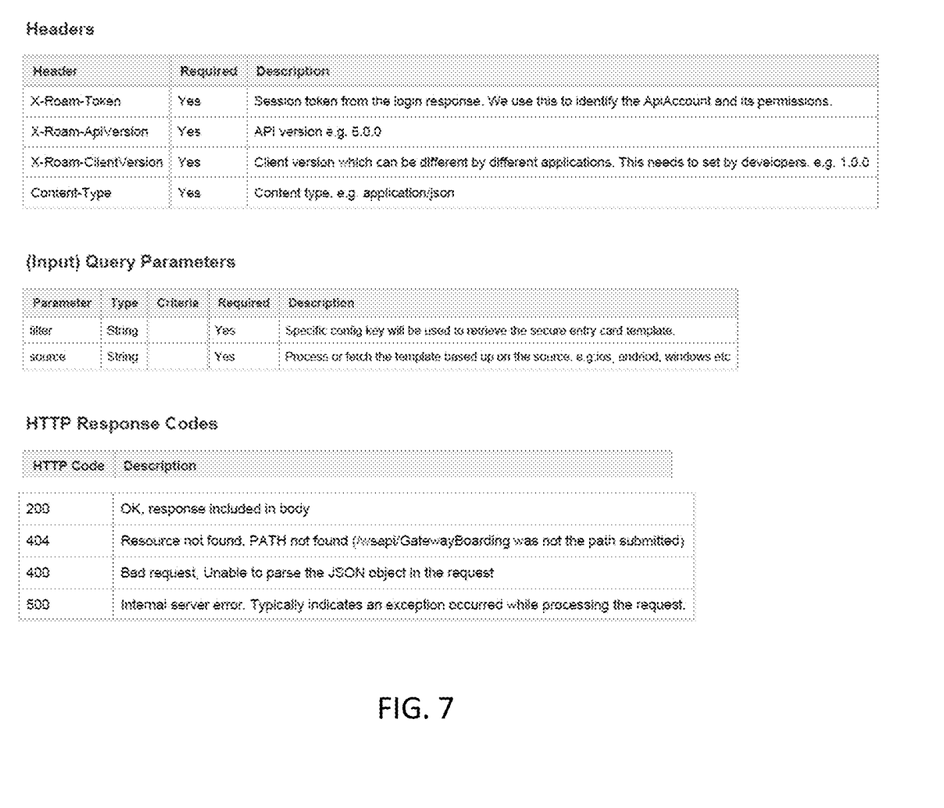
FIG. 7 shows sample Headers, (Input) Query Parameters, and HTTP Response Codes for one exemplary embodiment of the Templates API.
Figure 8:
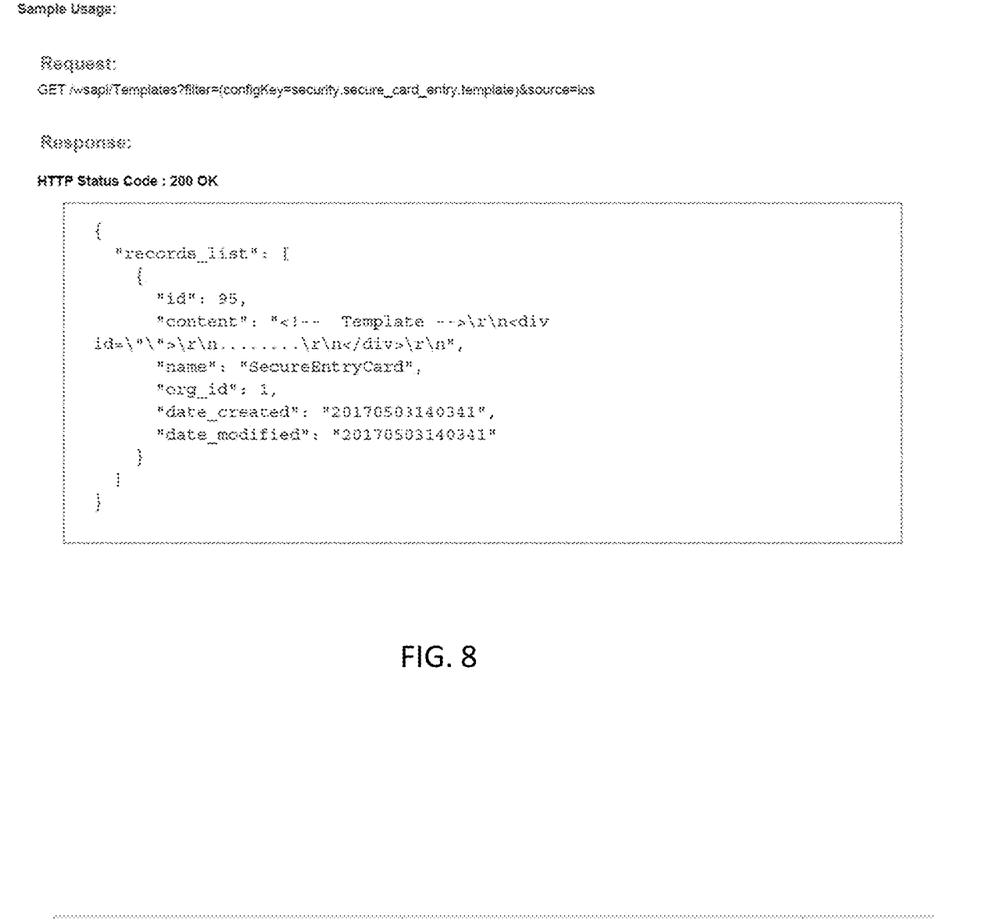
FIG. 8 shows a sample template request and a sample response.

This API fetches the secure card entry web page template, generates a new asymmetric key pair, injects the public key into the template, and returns the web page as response. FIG. 7 shows sample Headers, (Input) Query Parameters, and HTTP Response Codes for one exemplary embodiment of the Templates API. FIG. 8 shows a sample template request and a sample response.

Database Design

Figure 9:
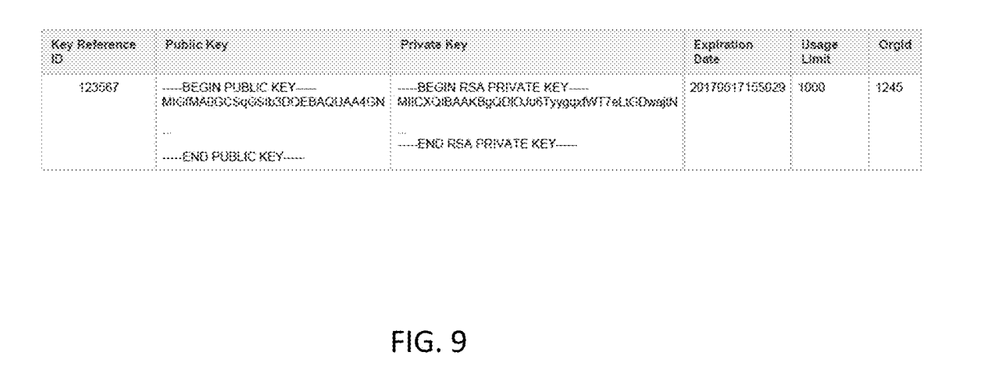
FIG. 9 shows a sample database table format for saving the public key and private key generated for a secure card entry webpage, in accordance with one exemplary embodiment.

FIG. 9 shows a sample database table format for saving the public key and private key generated for a secure card entry webpage, in accordance with one exemplary embodiment.

Support for Decryption of Secure Card Data

Figure 10:
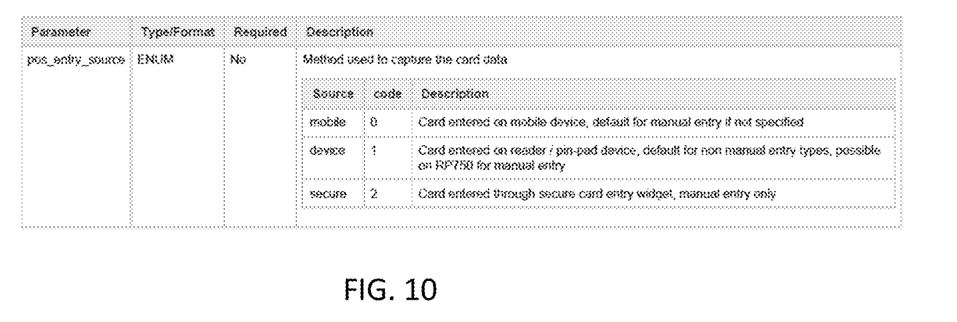
FIG. 10 shows a sample transaction type enumeration, in accordance with one exemplary embodiment.

The Gateway would create a new transaction type enumeration to indicate that the keyed transaction is performed through Secure card entry widget. FIG. 10 shows a sample transaction type enumeration, in accordance with one exemplary embodiment.

Figure 11:
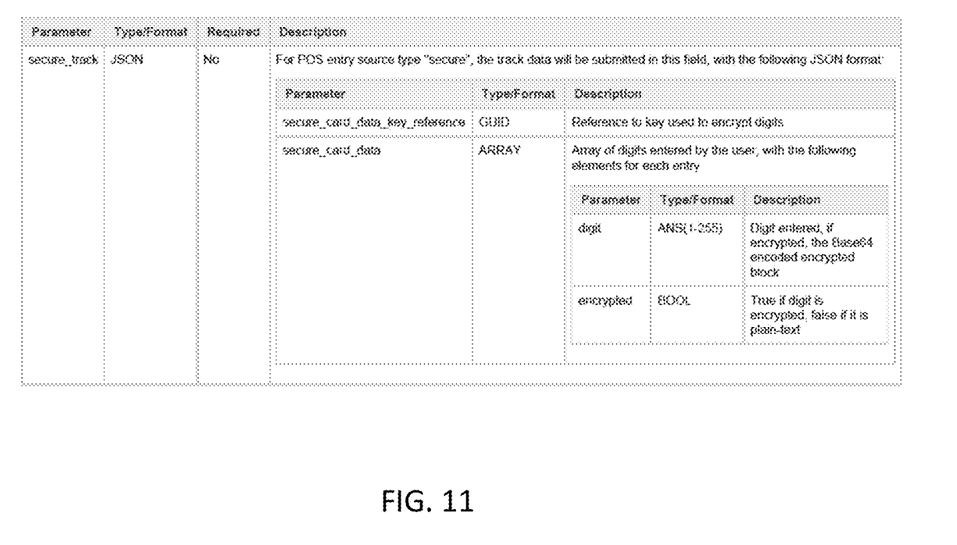
FIG. 11 shows sample JSON keys, in accordance with one exemplary embodiment.

The Gateway also would create a new JSON key as an input parameter to pass along the secure card data and another JSON key for the public key reference ID. FIG. 11 shows sample JSON keys, in accordance with one exemplary embodiment. The following is an example use of JSON keys:

```
{
"secure_card_data_key_reference" :
"e0f63066-86db-403c-83f3-c8af17aeef5b",
"secure_card_data":[
{
"value":"5",
"encrypted":"false"
},
{
"value":"5",
"encrypted":"false"
},
{
"value":"5",
"encrypted":"false"
},
{
"value":"5",
"encrypted":"false"
},
{
"value":"1",
"encrypted":"false"
},
{
"value":"1",
"encrypted":"false"
},
{
"value":"qOZduLCfwoMHoLUDUkVyHIw+osU5VRQ7my9+iEFCsgNuY7pVD
tSIhO3kbEDlEADU7
    BwYBmWJpmoq2JsJIWd2ANphxL0RnlWbXl1QQxKa/E/c/MAeKVNzGr1itRK
fxCG/LDoJJWP/xzm
    cLDMBhna64mnSf0wjzyWjxg0Bf6iCjGQ=",
"encrypted":"true"
},
{
"value":"MDJlKnb9pDdLcE8yjQzUA77UxF4tMiLMOqTQqk0Qah7QbIdZO4rp
6yoQB4FIZgzFw
    U31+Do3EnZRzUkwVGcjhU26HE1bxQyFBnTHMriQy3TBqj3Q+dYYHg/aFG
yknDsngUgEjj5WZ0s
    0YC0KwMjX+sd7ehrQkCnKpq1s7CjN2u0=",
"encrypted":"true"
},
{
"value":"swoCHD9czfGXaPm7E5aQZk3ShbK0poXAumVxYvonDdJqN+Uoek
Wdn0Q2f+Y+Ufbhb
    Uue2OCMNGjqTd9V1rFqqhCGyHGB8GREAgfuV2VTLb2XcRHXLgoOK2/Qr
ueZj3fhTkpHZzhSyRO
    UiElHSeJITS4+LNrzA3b0CqYPyrx7e0Q=",
"encrypted":"true"
},
{
"value":"3YmempaGeNf4fgK5HBa6vcQ0UKvjU8BkLJsFfGYY1w9yx6dw42sSJ
84g2fY96GcCY
    5FtzrIRPt3uNjmT0lZ12fSX0Grh/SqtvmYuuiLVVut4AWxp3fO8HB2Ma3IaL9s
VuJbx0+NOSip
    hZ0/Oac2vhpbMtnJlkt033Qs6wNEzRNU=",
```

-continued

```
    "encrypted":"true"
  },
  {
    "value":"m+4Ab4GsENH1LbyAScxfG+taxdTGXwBZVgqWSPWaHaCxPWnU9
PNgp0+rptqDfpuD/
    ja5S4TojboMgJlgCO820qM7z5oCZDWjZABxzGy59SSCgaoyV/jW4IDlS8BtG
KFWlYTSxOc8L2N
    Kvj+oZN9B4Ss3pRgnnBp1r/lNnxRI04g=",
    "encrypted":"true"
  },
  {
    "value":"3KpPqtDrKKUL8TvGPY+2i4WNqhw1EmY328dNf5Bmz6llwB2QnjD
xDAqxepCnxB0Lh
    5OpPDSsvGCm2t2f7hh2XByzGDy8QQQjdosEPR7RZL8p3Mha8yrLdbgGzun34
pYMxa6tso1EZ10
    lN0L1K8Y7W5OTDkYgcNkISKTAkLhVucM=",
    "encrypted":"true"
  },
  {
    "value":"1",
    "encrypted":"false"
  },
  {
    "value":"1",
    "encrypted":"false"
  },
  {
    "value":"1",
    "encrypted":"false"
  },
  {
    "value":"1",
    "encrypted":"false"
  }
]
```

The Gateway would consume the updated decryption API to decrypt the secure card data.

New API to C++ to Get the Secure Card Entry Webpage

The mPOS EMV SDK would add a new API on C++ layer to fetch the secure card entry webpage that would consume the new WSAPI SecureCardEntryContent.

New API to C++ to Pass Along the Secure Card Data to Gateway

The mPOS EMV SDK would add a new API on C++ layer to pass along the secure card data to gateway using the new parameters defined on Authorization API.

New UI Widgets for Android (Fragment) and iOS (View-Controller) that Will Render the Secure Card Entry Webpage The mPOS EMV SDK would create UI widget that contains a web view component to render the secure card entry webpage. The UI widget will fetch the secure card data from the web page when the submit/pay button is pressed and pass it along to the new C++ API.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

It should be noted that devices (e.g., the card data collection device, the MCM, and the gateway) typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the card data collection device, MCM, and gateway) are necessarily non-conventional because, absent special programming or configuration, the conventional components do not inherently perform the described non-conventional methods.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A system for providing secure card data entry for a payment transaction, the system comprising:
   a card data collection device that receives card data from a card reader device and includes a non-PCI-DSS validated payment application from an independent software vendor and a payment library from a payment vendor, wherein the payment library includes an application program interface (API) through which the payment application interfaces with the payment library; and
   a PCI-DSS validated backend system that communicates with the card data collection device over a communication network and processes transactions from the payment library, wherein:
   the payment application is configured to make a first request to the payment library to obtain a secure card entry webpage upon determining that sensitive data is required for the payment transaction;
   the payment library is configured to make a second request to the backend system upon receiving the first request from the payment application;
   the backend system is configured to return a complete secure card entry webpage ready for rendering to the payment library in response to the second request, the complete secure card entry webpage including fields for a user to enter sensitive data and further including a public encryption key for encrypting sensitive data entered by the user;
   the payment library is configured to cause rendering of the complete secure card entry webpage on a graphical user interface of the card data collection device, receive encrypted sensitive data entered by the user via the secure card entry webpage, and transmit a transaction request including the encrypted sensitive data to the backend system; and
   the backend system is configured to process the transaction request including decrypting the encrypted sensitive data using a private encryption key corresponding to the public encryption key.

2. The system of claim 1, wherein the secure card entry webpage is configured so that each digit of sensitive data entered by the user is encrypted as it is entered.

3. The system of claim 1, wherein the backend system is configured to generate the public encryption key and the private encryption key upon receiving the second request.

4. The system of claim 3, wherein the backend system is configured to store at least the private encryption key for use in decrypting the encrypted sensitive data.

5. The system of claim 3, wherein the backend system is configured to associate the public encryption key and the private encryption key with a key reference identifier and to include the key reference identifier in the secure card entry webpage.

6. The system of claim 5, wherein the payment library is configured to include the key reference identifier in the transaction request.

7. The system of claim 3, wherein the backend system is configured to associate the public encryption key and the private encryption key with an expiration day/time and to include the expiration day/time in the secure card entry webpage.

8. The system of claim 1, wherein the payment library is configured to render the secure card entry webpage.

9. The system of claim 1, wherein the payment library is configured to send the secure card entry webpage to a native browser of the card data collection device for rendering.

10. The system of claim 1, wherein the card data collection device is a smartphone.

11. The system of claim 1, wherein the card data collection device is a tablet computer.

12. The system of claim 1, further comprising a card reader device in communication with the card data collection device, wherein the payment library is configured to include card data obtained from the card reader device in the transaction request.

13. The system of claim 1, wherein the backend system is configured to generate the secure card entry webpage based on a stored webpage template.

14. The system of claim 1, wherein the backend system comprises:
   a Mobile Commerce Manager configured to receive the second request, generate the secure card entry webpage, return the secure card entry webpage to the payment library, and decrypt the encrypted sensitive data in the transaction request; and
   a Gateway configured to receive the transaction request and transmit a request to the Mobile Commerce Manager for decryption of the encrypted sensitive data in the transaction request.

15. The system of claim 14, wherein the Mobile Commerce Manager and the Gateway are separate physical devices.

16. The system of claim 14, wherein the Mobile Commerce Manager and the Gateway are separate logical devices.

* * * * *